United States Patent [19]

Takeuchi et al.

[11] Patent Number: 5,828,973
[45] Date of Patent: Oct. 27, 1998

[54] ELECTRIC POWER STEERING APPARATUS

[75] Inventors: Kanji Takeuchi, Kamagoori; Takeshi Sawada, Chiryu, both of Japan

[73] Assignee: Nippondenso Co., Ltd., Kariya, Japan

[21] Appl. No.: 616,632

[22] Filed: Mar. 15, 1996

[30] Foreign Application Priority Data

Mar. 17, 1995 [JP] Japan ................................. 7-058417
Mar. 20, 1995 [JP] Japan ................................. 7-060285

[51] Int. Cl.⁶ ................................ B62D 5/04; B62D 6/10
[52] U.S. Cl. ............................. 701/41; 701/42; 180/412; 180/443; 180/446
[58] Field of Search ..................... 364/424.051, 424.052, 364/426.015; 180/443, 446, 410, 412, 423; 318/432, 434; 701/41, 42, 71

[56] References Cited

U.S. PATENT DOCUMENTS

| | | | |
|---|---|---|---|
| 4,905,783 | 3/1990 | Bober | 180/422 |
| 4,945,298 | 7/1990 | Nakashima | 318/635 |
| 4,979,114 | 12/1990 | Oshita et al. | 364/424.051 |
| 5,072,803 | 12/1991 | Kilian et al. | 364/424.051 |
| 5,313,389 | 5/1994 | Yasui | 364/424.053 |
| 5,404,960 | 4/1995 | Wada et al. | 180/446 |

FOREIGN PATENT DOCUMENTS

| | | |
|---|---|---|
| 350 817 | 1/1990 | European Pat. Off. . |
| 0 460 582 | 12/1991 | European Pat. Off. . |
| 686 542 | 12/1995 | European Pat. Off. . |
| 39 17 053 | 12/1989 | Germany . |
| 59-195470 | 11/1984 | Japan . |
| 62-37275 | 2/1987 | Japan . |
| 1-218971 | 9/1989 | Japan . |
| 6-29032 | 4/1994 | Japan . |
| 2 202 501 | 9/1988 | United Kingdom . |
| 2 220 627 | 1/1990 | United Kingdom . |

Primary Examiner—Tan Q. Nguyen
Attorney, Agent, or Firm—Cushman Darby & Cushman IP Group of Pillsbury Madison & Sutro LLP

[57] ABSTRACT

An electric power steering apparatus for recovering a steering wheel to its neutral position based on the speeds of the steered wheels of a vehicle. In response to a steering torque signal from a torque sensor, assisting torque by a motor is controlled in a torque servo system from a phase compensating filter to a current detecting unit. A microcomputer calculates a speed ratio of left and right wheels based on wheel speeds detected by wheel speed sensors. Recovery compensating torque is obtained from the speed ratio of the left and right wheels, and a corresponding signal is output to an addition calculating unit. The addition calculating unit adds the steering torque signal and the signal representing the recovery compensating torque to obtain a recovery compensated signal. Based on the recovery compensated signal, the assisting torque is controlled to recover the steering to its neutral position.

25 Claims, 15 Drawing Sheets

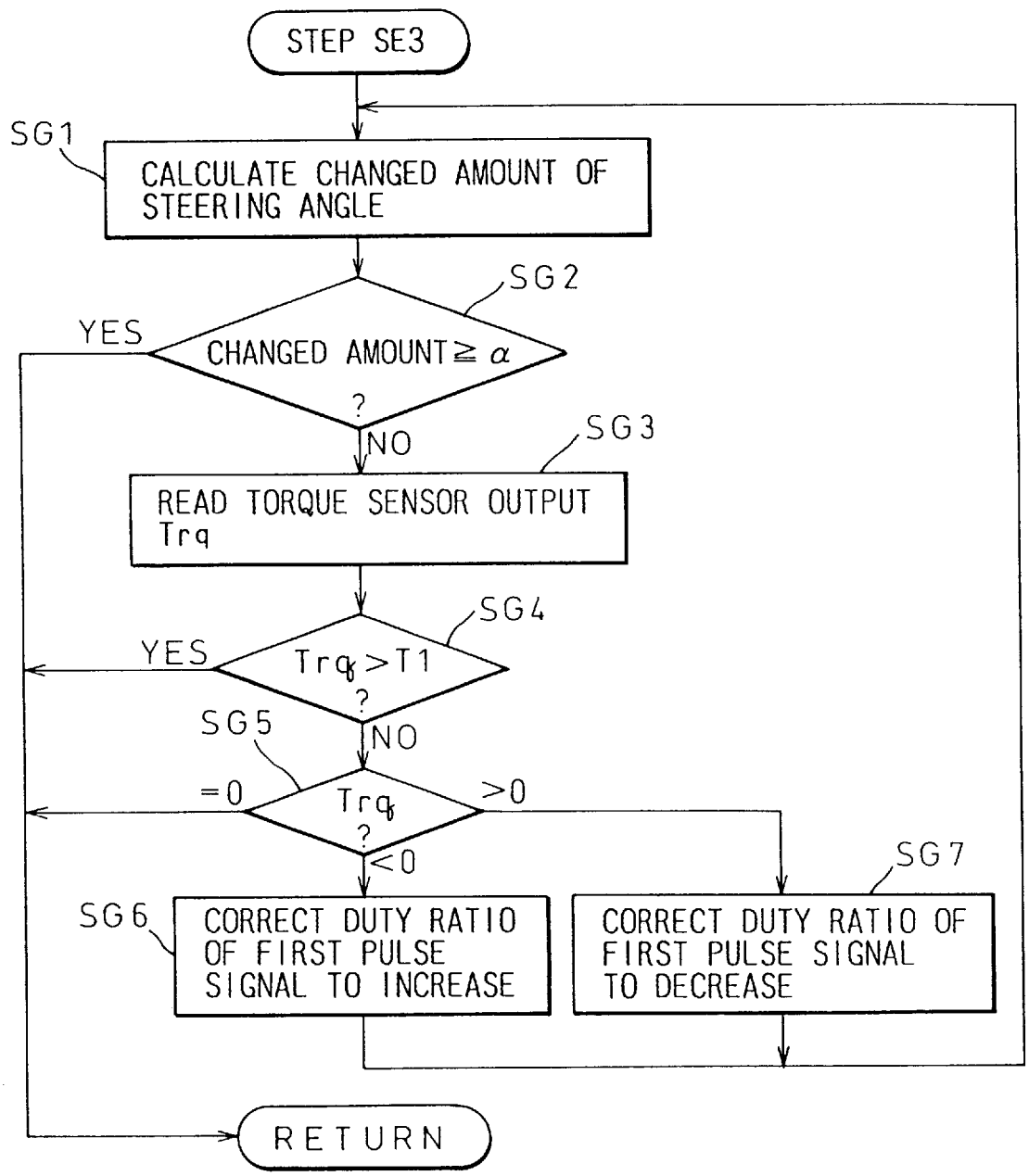

ELECTRIC POWER STEERING APPARATUS

BACKGROUND OF THE INVENTION

1. Field of the Invention

The present invention relates to an electric power steering apparatus for assisting the steering of a vehicle by using a driving force from a motor.

2. Description of the Related Art

In a conventional electric power steering apparatus, a motor for assisting a steering force is coupled to a steering mechanism including a steering wheel through reduction gears having a large ratio. Load torque such as friction torque is generated in the motor while the motor is driving the steering wheel. The generated load torque is amplified by the ratio of the above-mentioned reduction gears and is applied to the steering wheel. This amplified load torque makes it difficult to move the steering wheel.

On the other hand, a vehicle without a power steering apparatus has such a structure that, even when the hands of a driver are away from the steering wheel after moving it, the steering wheel is automatically recovered to its neutral position because of a self-aligning torque generated from the tires of the vehicle wheels.

In the case of a vehicle provided with the electric power steering apparatus, however, the steering wheel cannot recover to its neutral position because the above-mentioned amplified load torque is larger than the self-aligning torque.

As a prior art to recover the steering wheel to its neutral position, Japanese Patent Publication (Kokoku) No. 6-29032 discloses an apparatus in which, by using a steering angle sensor, the steering wheel is controlled to recover to its neutral position based on the detected steering angle.

The apparatus using the steering angle sensor, however, has a problem in that the structure of the steering angle sensor is complex. Also, since the steering wheel is operated in multiple rotations so that the detection of the absolute steering angle is difficult, a steering angle sensor for detecting the steering angle by measuring rotation pulses is generally used. This type, however, has a problem in that, since it can detect only a relative position, it is difficult to determine the position of the neutral steering angle.

Accordingly, an object of the present invention is to perform recovery to a neutral position without using a steering angle sensor.

From another point of view, in the power steering apparatus, it is important to transmit road information to a driver, as well as to give an appropriate steering reaction in accordance with the running state of the vehicle. That is, steering feeling is important. In the conventional electric power steering apparatus, the motor directly assists torque. In this conventional apparatus, however, the steering feeling is determined by controlling the motor. In particular, due to the torque control, a driver has low sensitivity for the amount of torque but has a high sensitivity for fluctuation of torque. Therefore, the driver can sense even a slight torque fluctuation so that it is necessary to construct a control system with smaller torque fluctuation.

Before microcomputers appeared, an analog circuit, using an operational amplifier, was used to carry out a torque feedback control.

However, since corrections of nonlinear factors such as vehicle speed sensing, recovery control to the neutral steering angle, malfunction diagnosis and so forth have been required, it has been a trend to control all these functions by a microcomputer in digital fashion. The digital control has an advantage of being able to simplify circuits but it is a discrete value control in which the output of the torque sensor is read in a certain sampling period to be calculated and output, so that a time delay is generated in the control system, leading a disadvantage in that a self-exciting oscillation is easily generated.

To obviate such a disadvantage, in the prior art, Japanese Patent Publication (Kokoku) No. 1-218971 discloses a system in which the torque servo control is carried out by an analog circuit, and a change of the control parameters, such as the vehicle speed sensitivity, is carried out by a microcomputer.

The system disclosed in the Japanese Patent Publication (Kokoku) No. 1-218971, however, requires decoders, plural latch circuits, A/D converters and so forth to transmit signals from the digital part to the analog circuit. In addition, plural multiplication units are necessary to vary the gain. That is, there is a problem in that the interface part between the digital part and the analog circuit is complex.

In view of the above problem, another object of the present invention is, in a system in which a torque servo control is carried out by an analog circuit and its control parameters are changed by a digital circuit, to simplify the construction of the interface between the analog circuit and the digital circuit.

SUMMARY OF THE INVENTION

To attain the above first object, according to a first aspect of the present invention, there is provided an electric power steering apparatus comprising a motor for generating assisting torque in response to a movement of a steering wheel of a vehicle, and a steering torque detecting unit for detecting steering torque of the steering wheel to output a steering torque signal, for controlling the assisting torque generated by the motor based on the output steering torque signal. It comprises a recovery compensating unit for recovering the steering wheel to a neutral position based on the speeds of the left and the right wheels of the vehicle.

According to a second aspect of the present invention, there is provided an electric power steering apparatus, according to the first aspect, characterized in that the recovery compensating unit comprises a signal generating unit for outputting a recovery compensating signal, for generating a recovery compensating torque, based on the speeds of the left and the right wheels, and a converting unit for converting the steering torque signal into a recovery compensated signal by using the output recovery compensating signal.

According to a third aspect of the present invention, there is provided an electric power steering apparatus characterized by comprising a motor for generating assisting torque in response to a movement of a steering wheel of a vehicle and a steering torque detecting unit for detecting steering torque of the steering wheel to output a steering torque signal. The electric power steering apparatus also includes a signal generating unit for outputting a recovery compensating signal for generating a recovery compensating torque based on the speeds of the left and the right wheels of a vehicle, and for outputting a vehicle speed sensitive gain representing a gain for sensing the vehicle speed based on the running speed of the vehicle. The apparatus further comprises a converting unit for converting the output steering torque signal into a recovery compensated signal by using the output recovery compensating signal and an assisting torque calculating unit for discriminating the rotary driving direction of the motor, based on the recovery compensated signal, and for outputting an assisting torque signal for driving the motor. The apparatus further includes a gain changing unit for changing the gain of the output assisting torque signal in response to the speed sensitive gain signal, and a motor driving unit for driving the motor based on the magnitude of the gain-changed assisting torque signal and on the discriminated rotary driving direction of the motor.

According to a fourth aspect of the present invention, there is provided an electric power steering apparatus according to the second or the third aspect of the present invention, characterized in that the steering torque signal is a direct current signal which proportionally changes in response to the steering torque, and the converting unit shifts the steering torque signal in a D.C. fashion by using the recovery compensating signal.

According to a fifth aspect of the present invention, there is provided an electric power steering apparatus according to the fourth aspect of the present invention, characterized in that the signal generating unit outputs a pulse signal having a duty ratio representing the recovery compensating torque, and the converting unit converts the pulse signal into a D.C. signal, the steering torque signal being shifted in a D.C. fashion by using the D.C. signal.

According to a sixth aspect of the present invention, there is provided an electric power steering apparatus according to any one of the second to fifth aspects of the present invention, characterized in that the signal generating unit outputs the recovery compensating signal by determining the ratio of the speeds of the left and the right vehicle wheels, by using vehicle wheel speed signals from vehicle wheel speed detecting unit for detecting the wheel speeds of the left and the right wheels of the vehicle.

According to a seventh aspect of the present invention, there is provided an electric power steering apparatus according to any one of the second to fifth aspects of the present invention, characterized in that the signal generating unit receives, through a signal line, a signal for determining the ratio of the speeds of the vehicle wheels from a control unit for performing the other control of the vehicle based on the vehicle speeds of the left and the right vehicle wheels, and for outputting the recovery compensating signal by using the received input.

According to an eighth aspect of the present invention, there is provided an electric power steering apparatus according to the seventh aspect of the present invention, characterized in that the signal generating unit has detecting unit for detecting a disconnected state of the signal line based on the received signal from a control unit for performing other control.

According to a ninth aspect of the present invention, there is provided the electric power steering apparatus according to the eighth aspect of the present invention, characterized in that the signal generating unit has a unit for stopping the torque assist from the motor when the disconnection is detected.

According to a tenth aspect of the present invention, there is provided the electric power steering apparatus according to any one of the seventh to ninth aspects of the present invention, characterized in that the control unit for performing other control of the vehicle is a control unit for performing brake control of the vehicle.

To attain the second object, according to an eleventh aspect of the present invention, there is provided an electric power steering apparatus comprising a motor for generating assisting torque in response to a movement of a steering wheel of a vehicle, a steering torque detecting unit for detecting steering torque of the steering wheel to output a steering torque signal, and assisting torque controlling unit for controlling, based on the output steering torque signal, the assisting torque by the motor. The apparatus also includes parameter setting unit for setting control parameters for changing the assisting torque, characterized in that the parameter setting unit has a digital circuit unit for preparing and outputting a pulse signal with a duty ratio representing the control parameters, and the assisting torque control unit is constructed by an analog circuit and has circuit unit for changing the assisting torque based on the duty ratio of the output pulse signal.

According to a twelfth aspect of the present invention, there is provided an electric power steering apparatus according to the eleventh aspect of the present invention, characterized in that the digital circuit unit has a unit for preparing and outputting a first pulse signal with a duty ratio representing a recovery compensating torque to a neutral position based on at least a steering angle of the vehicle.

According to a thirteenth aspect of the present invention, there is provided and electric power steering apparatus according to the twelfth aspect of the present invention, characterized in that the circuit unit has a converting circuit for converting the first pulse signal into a D.C. signal having a value corresponding to the duty ratio of the first pulse signal, and a circuit for shifting the assisting torque in a D.C. manner by using the converted D.C. signal.

According to a fourteenth aspect of the present invention, there is provided an electric power steering apparatus according to any one of the first to third aspects of the present invention, characterized in that the digital circuit unit has a unit for preparing and outputting a second pulse signal with a duty ratio corresponding to a running speed of the vehicle.

According to the fifteenth aspect of the present invention, there is provided an electric power steering apparatus according to the fourteenth aspect of the present invention, characterized in that the circuit unit has a circuit for changing a gain of the assisting torque in accordance with the duty ratio of the second pulse signal.

According to the sixteenth aspect of the present invention, there is provided an electric power steering apparatus characterized by comprising a motor for generating assisting torque in response to a movement of a steering wheel of a vehicle and a steering torque detecting unit for detecting steering torque of the steering wheel to output a steering torque signal. The apparatus also includes a computer unit for receiving a signal representing a steering angle of the vehicle and a signal representing a running speed of the vehicle to prepare and output a first pulse signal with a duty ratio representing a recovery compensating torque based on the steering angle and the running speed represented by these signals, and to prepare and output a second pulse signal with a duty ratio representing a gain corresponding to the detected running speed. The apparatus further comprises an assisting torque control circuit constructed by an analog circuit for controlling, based on the output steering torque signal, assisting torque generated by the motor. The assisting torque control circuit comprises; a recovery compensating unit for smoothing the output first pulse signal and for shifting, in a D.C. manner, the output steering torque signal by the smoothed signal; an assisting torque calculating unit for discriminating a rotary driving direction based on the steering torque signal shifted in the D.C. fashion, and for driving the motor; a gain changing unit for changing a gain of the output assisting torque signal in accordance with the duty ratio of the second pulse signal; and a motor driving unit for driving the motor based on the amount of the gain-changed assisting torque signal and the discriminated rotary driving direction of the motor.

According to a seventeenth aspect of the present invention, there is provided an electric power steering apparatus according to the sixteenth aspect of the present invention, characterized in that the recovery compensating unit comprises a smoothing circuit for smoothing the first pulse signal into a signal having a magnitude corresponding to the duty ratio of the first pulse signal, and an addition circuit for adding the smoothed D.C. signal and the steering torque signal.

According to the eighteenth aspect of the present invention, there is provided an electric power steering apparatus according to the sixteenth or seventeenth aspect of the present invention, characterized in that the gain changing unit comprises a switching circuit for switching in response to the second pulse signal, and the assisting torque signal in which the gain has been changed by the switching operation is output as a D.C. signal.

According to the nineteenth aspect of the present invention, there is provided an electric power steering apparatus according to any one of the sixteenth to eighteenth aspects of the present invention, characterized in that the frequencies of the first pulse signal and second pulse signal are set to values which can make the first pulse signal and second pulse signal function as direct current signals when they are compared with a response frequency of a torque servo system in the assisting torque control circuit.

According to the twentieth aspect of the present invention, there is provided an electric power steering apparatus according to any one of the sixteenth to nineteenth aspects of the present invention, characterized in that the computer unit has a unit for reading a real motor current value actually flowing through the motor, a unit for estimating and calculating a target motor current value for driving the motor, based on the steering torque signal, the signal representing the steering angle and the signal representing the running speed of the vehicle, and a malfunction diagnosing unit for stopping the torque assisting by the motor when the difference between the target motor current value and the real motor current value is a predetermined value or more.

According to the twenty-first aspect of the present invention, there is provided an electric power steering apparatus according to any one of the sixth to twentieth aspects of the present invention, characterized in that the computer unit has a straight running detecting unit for detecting a straight running state of the vehicle, and a unit for changing the duty ratio of the first pulse signal in such a manner that, when the straight running state is detected, the steering torque signal to be shifted in the recovery compensating unit has a value of a state without a steering capability.

According to the twenty-second aspect of the present invention, there is provided an electric power steering apparatus according to the twenty-first aspect of the present invention, characterized in that the straight running detecting unit detects a straight running state of the vehicle when the amount of change of the steering angle is a predetermined value or less, and the steering torque is a predetermined value or less.

According to the twenty-third aspect of the present invention, there is provided a control apparatus for controlling a unit in a vehicle, comprising a wheel speed detecting unit for detecting the speeds of the left and the right wheels, and a control unit for controlling the unit in the vehicle based on the speeds of the left and the right wheels detected by the wheel speed detecting unit.

According to the twenty-fourth aspect of the present invention, the wheel speed detecting unit in the twenty-third aspect is included in an anti-block braking system for performing brake control based on the speeds of the left and the right wheels.

According to any one of the first to tenth aspects of the present invention, the steering wheel is intended to recover to the neutral position based on the speeds of the left and the right wheels of a vehicle.

Accordingly, without using a steering angle sensor, a recovery control to the neutral position can be carried out by using the wheel speeds of the vehicle.

In particular, according to the seventh to tenth aspects of the present invention, such wheel speeds can be obtained by using a signal from another control unit so that the construction can be simplified by using the signal from the other control unit.

According to any one of the eleventh to twenty-second aspects of the present invention, the circuit for carrying out the assisting torque control by driving the motor based on the steering torque signal is constructed by an analog circuit, and the circuit for setting the control parameters for the assisting torque is constructed by a digital circuit. A pulse signal having a duty ratio representing the control parameters is output from the digital circuit. In the analog circuit, the assisting torque is changed based on the duty ratio.

Accordingly, by transmitting the signal as a pulse signal having the duty ratio of the control parameters, that is, a PWM signal, the construction of the interface between both circuits in the electric power steering apparatus can be simplified.

In addition, as in the nineteenth aspect of the present invention, by making the frequencies of the first pulse signal and the second pulse signal to be values by which these signals can function as D.C. signals when they are compared with the response frequency of the torque servo system, matching between the digital circuit and the analog circuit can be attained.

Further, according to the twentieth aspect of the present invention, the target motor current is estimated in the computer unit to detect the difference between the target motor current and the actual motor current, whereby an abnormality in the torque servo system can be determined so that, in case of such an abnormal state, it is possible to stop the torque assist by the motor to allow a manual steering operation.

Still further, according to the twenty-first or the twenty-second aspect of the present invention, correction of drift in the steering torque signal can be carried out.

Still further, according to the twenty-third and twenty-fourth aspects of the present invention, the left and the right wheel speeds detected in the anti-lock brake system can be used to control any other unit in the vehicle so that an additional wheel speed detecting unit is not required.

BRIEF DESCRIPTION OF THE DRAWINGS

The above objects and features of the present invention will be more apparent from the following description of the preferred embodiments when read in conjunction with the accompanying drawings, wherein:

FIG. 17 is a flowchart showing a drift correction process of the steering torque signal in the third embodiment.

DESCRIPTION OF THE PREFERRED EMBODIMENTS

Figure 1:
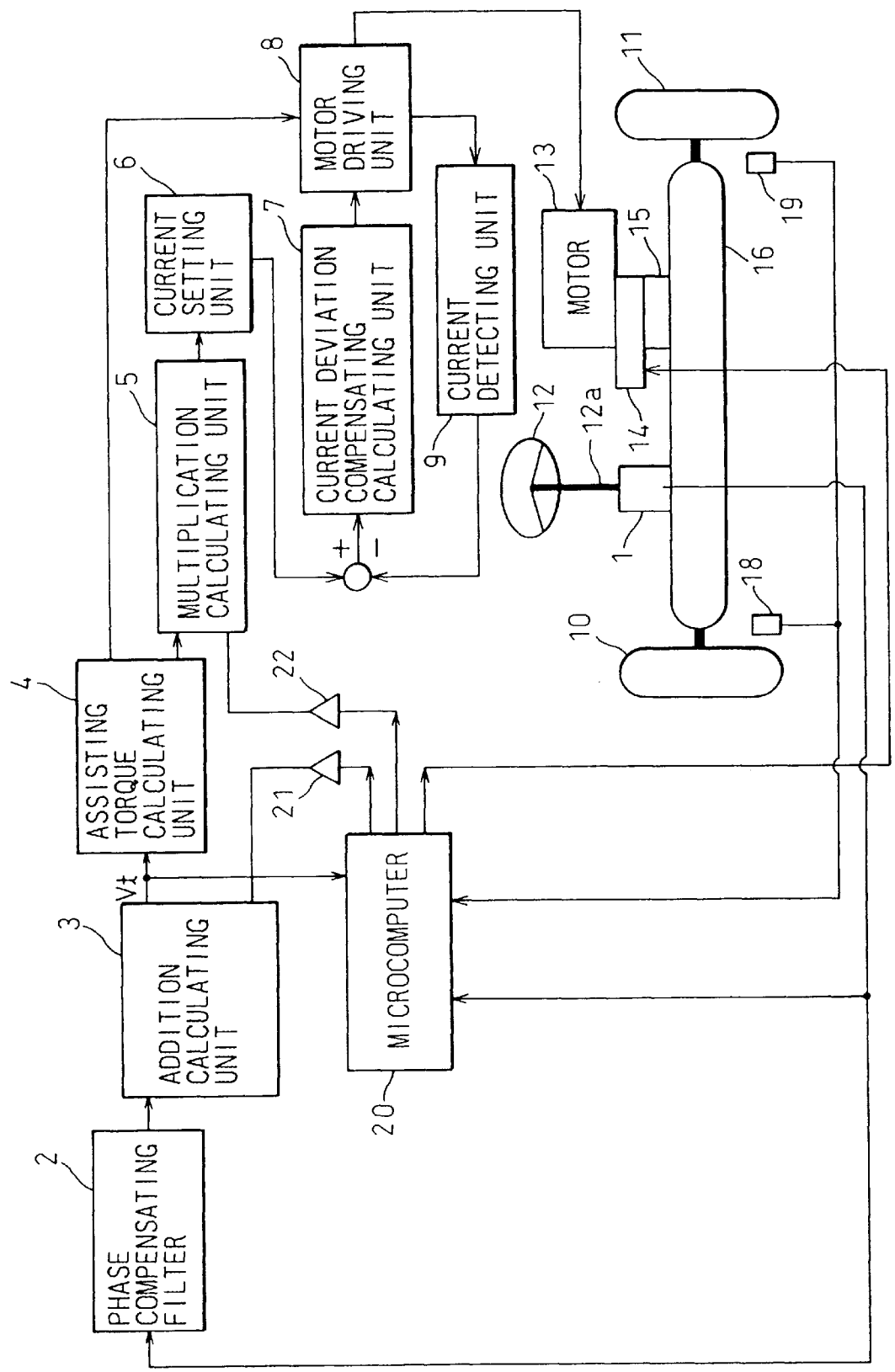
FIG. 1 is a block diagram showing a main construction of an electric power steering apparatus according to a first embodiment of the present invention.

In the following, embodiments of the present invention will be described with reference to the drawings. Throughout the figures, the same reference numerals represent the same or similar parts.

First Embodiment

FIG. 1 is a block diagram showing the main construction of an electric power steering apparatus according to a first embodiment of the present invention.

In FIG. 1, at a base portion of a steering shaft 12a to which a steering wheel 12 is attached, a torque sensor 1 for detecting a steering torque is provided. Speed reduction gears 15 are coupled to a rack shaft 16 for coupling a right steered wheel 10 and a left steered wheel 11. A motor 13 for assisting the steering effort is coupled through a power clutch 14 to the reduction gears 15. Vehicle speed sensors 18 and 19 for detecting the vehicle speed signals are provided on the right steered wheel 10 and the left steered wheel 11, respectively.

Steering torque applied to the steering wheel 12 is detected by the torque sensor 1. The torque sensor 1 outputs a steering torque signal of a D.C. voltage proportional to the steering effort in such a way that it outputs a predetermined voltage level when the steering torque is zero, outputs an increased voltage when a right steering effort is applied, and outputs a decreased voltage when a left steering effort is applied.

Based on the steering torque signal, a torque servo system, having a circuit constructed by a phase compensating filter 2, a current detecting unit 9, and units 3–8 between the phase compensating filter 2 and the current detecting unit 9, performs torque servo control by supplying an assisting current to the motor 13.

Also, a microcomputer 20 is provided for outputting control parameters used for recovery control to recover the steering angle to its neutral steering angle and for speed sensitive control. The microcomputer 20 outputs a first pulse signal having a duty ratio representing a recovery compensating torque and a second pulse signal having a duty ratio representing a gain for sensing a vehicle speed, which are output to an addition calculating unit (recovery compensating unit) 3, and a multiplication calculating unit 5, respectively. The gain is defined as a ratio or an assisting torque generated by a current supplied to the motor and an input steering torque. The gain mainly depends on the vehicle speed. The calculating process by the microcomputer 20 to output the first and the second pulse signals will be described later in more detail.

In the following, torque servo control using these first and the second parameters as the control parameters will be described.

A phase compensating filter 2 corrects a detection delay in the steering torque signal output from the torque sensor 1, and removes noise from the steering torque signal. The output of the phase compensating filter 2 is input to the addition calculating unit 3. The first pulse signal from the microcomputer 20 is input through a buffer 21 to the addition calculating unit 3. Here, the signal output from the phase compensating filter 2 is referred to as a signal Vt, and the first pulse signal is referred to as a signal Doff.

Figure 2:
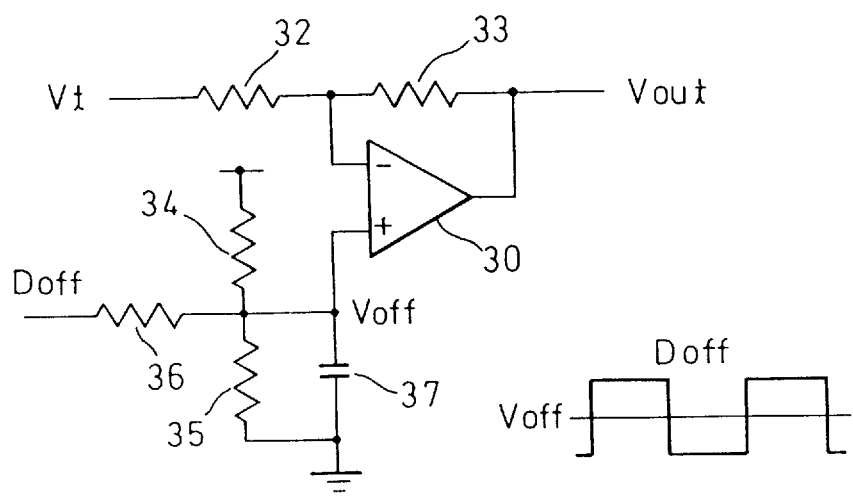
FIG. 2 is a circuit diagram showing an addition calculating unit 3 in the block diagram in FIG. 1.

The practical circuit of this addition calculating unit 3 is shown in FIG. 2. The addition calculating unit 3 consists of an operational amplifier (differential inverting amplifier) 30, resistors 32–36 and a capacitor 37.

In FIG. 2, the first pulse signal Doff is input to a smoothing circuit consisting of the resistors 34–36 and the capacitor 37. During a period when the signal Doff is at a "high" level, the resistor 36 is connected to the resistor 34 in parallel; and during a period when the signal Doff is at a "low level", the resistor 36 is connected to the resistor 35 in parallel. Accordingly, the voltage Voff at a branch point between the resistors 34 and 35 changes depending on the value of the resistor 36 and the duty ratio of the signal Doff. The voltage Voff is smoothed by the capacitor 37 to be applied to a (+) terminal of the operational amplifier 30. Namely, the first pulse signal Doff passed through the resistor 36 is smoothed by the capacitor 37 to be converted into a direct current signal (offset voltage) Voff which is applied to the (+) terminal of the operational amplifier 30. The level of the offset voltage Voff is determined by the duty ratio of the first pulse signal Doff.

The operational amplifier 30 adds the direct current signal Voff and the signal Vt to output a signal Vout. Namely, an offset voltage Voff determined by the first pulse signal Doff is added to the signal Vt corresponding to the steering torque signal from the torque sensor 1 so that the signal Vt is shifted by a D.C. voltage to be an output signal Vout.

In this connection, the resistance value of the resistor 36 is set to be sufficiently larger than the resistance value of each of the resistors 34 and 35 so as to limit the magnitude of the change of the offset voltage Voff. By this construction, even when the microcomputer 20 runs out so that the first pulse signal Doff becomes an abnormal value, the generation of an abnormal assisting torque can be prevented.

Then, the signal Vout is input to an assisting torque calculating unit 4. A practical circuit of the assisting torque calculating unit 4 is shown in FIG. 3.

Figure 3:
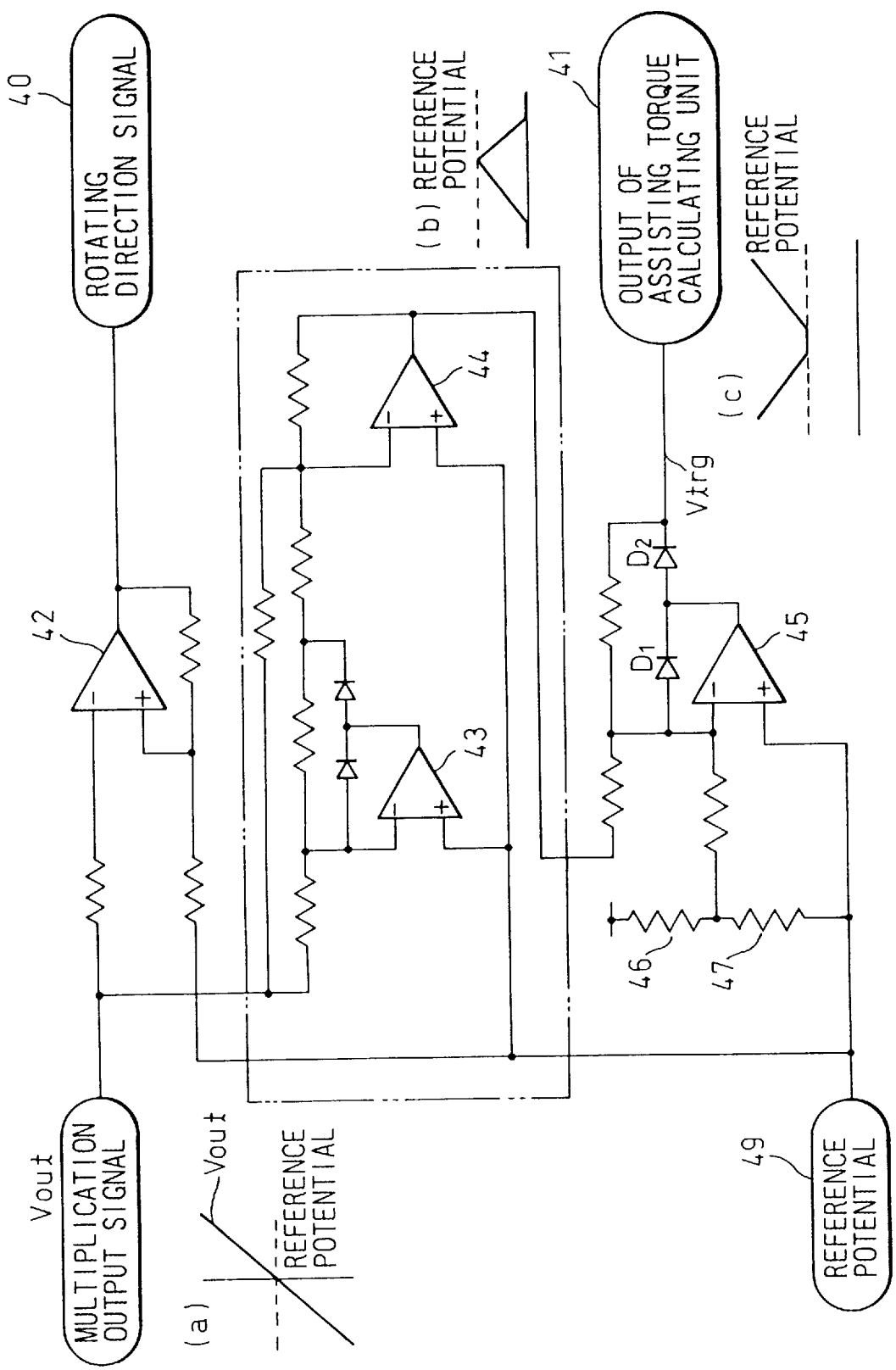
FIG. 3 is a circuit diagram showing an assisting torque calculating unit 4 in the block diagram in FIG. 1.

In FIG. 3, the signal Vout shown by (a) is input to a comparator 42 to be compared with a reference potential 49. By the compared result, the rotating direction of a motor 13 is determined. The signal representing the rotating direction is output as a rotating direction signal 40.

The signal Vout is also input to an absolute value circuit A, constructed by operational amplifiers 43 and 44 and so forth, in which, in the signal shown by (a), the portion above the reference potential is inverted with respect to the reference voltage. The converted signal is shown by (b).

The signal shown by (b) is then converted to a signal shown by (c) by a circuit constructed by resistors 46 and 47, a differential inverting amplifier 45, diodes D1 and D2 and so forth, and is output as an output 41 (an assisting torque signal, hereinafter referred to as Vtrq) of an assisting torque calculating unit 4.

This signal (c) is, as illustrated in the figure, clamped by the reference potential. The clamping range is set by the resistors 46 and 47. The clamping range is a non sensitive region in which no torque assist is performed.

The output signal Vtrq from the assisting torque calculating unit 4 is input to the multiplication calculating unit 5. On the other hand, the second pulse signal (hereinafter referred to as the signal Dvgain) having a duty ratio representing a gain for sensing the vehicle speed is also input from the microcomputer 20 to the multiplication calculating unit 5. A practical circuit construction of this multiplication calculating unit 5 is shown in FIG. 4.

Figure 4:
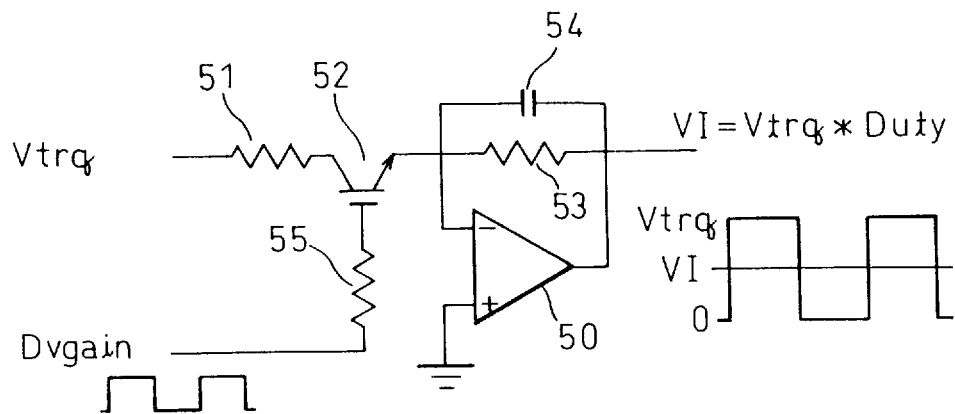
FIG. 4 is a circuit diagram of a multiplicity calculating circuit 5 in the block diagram in FIG 1.

In FIG. 4, the signal Vtrq is input through a resistor 51 and a field effect transistor (FET) 52 to an operational amplifier 50. The signal Dvgain from the microcomputer 20 is input through a resistor 55 to the gate of the FET 52. Here, the resistors 51 and 55 and the FET 52 constitute a switching circuit and the operational amplifier 50, the resistor 53 and the capacitor 54 constitute an inverting and amplifying circuit.

The FET 52 performs a switching operation in accordance with the input level of the second pulse signal Dvgain. In accordance with this switching operation, the voltage of the signal Vtrq applied to the inverting and amplifying circuit is controlled. That is, by the switching operation, the signal Vtrq is multiplied by the duty ratio to form another signal. This signal is amplified by the inverting and amplifying circuit.

This inverting and amplifying circuit is constructed by the use of a capacitor 54 which operates to output a D.C. signal VI. The D.C. signal VI is expressed as VI=K*Vtrq*Duty Ratio, where K is an amplification factor. Accordingly, the gain of the signal Vtrq changes in accordance with the duty ratio of the second pulse signal Dvgain, i.e., in accordance with the vehicle speed.

The signal output from the multiplication calculating unit 5 is converted by a current setting unit 6 into a current command value for the motor 13. At this time, an assisting current value corresponding to the difference between the above-mentioned reference potential and the D.C. signal VI output from the multiplication calculating unit 5 is set. Based on the assisting torque value set as above, an assisting current is supplied to the motor 13 through a minor loop of a constant current control constructed by a motor driving unit 8 and a current detecting unit 9. Thus, an assisting torque control is effected by the motor 13.

Figure 5:
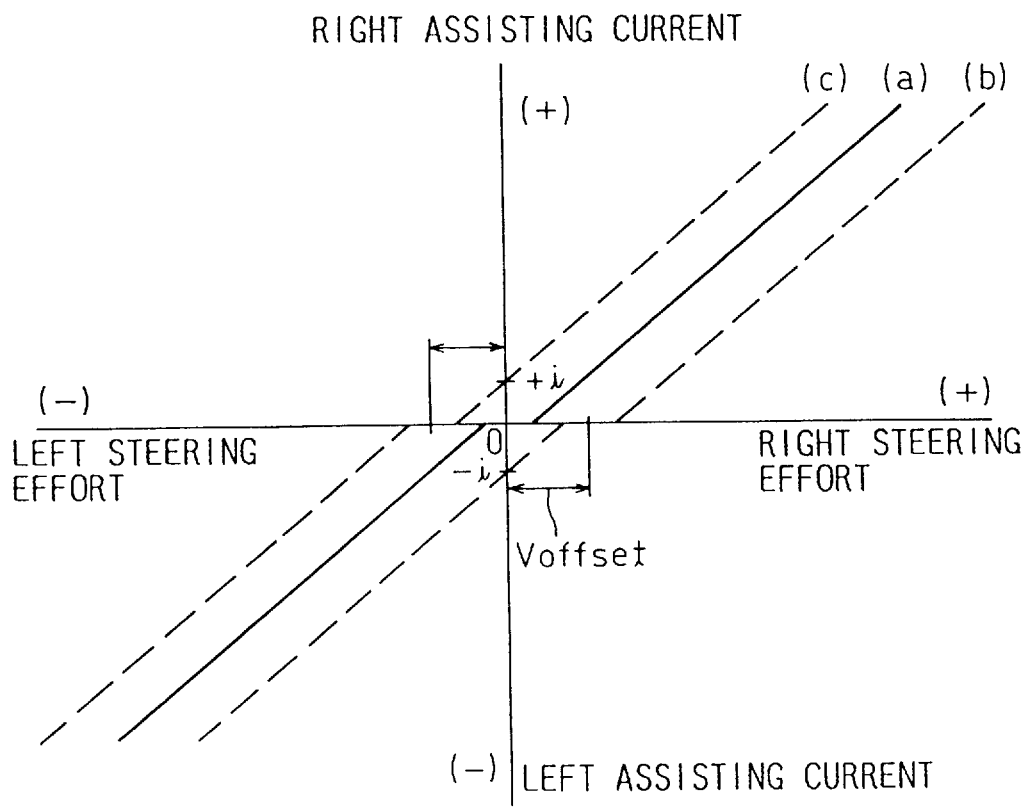
FIG. 5 is a graph showing the relation between the steering effort and the assisting current.

FIG. 5 shows a relation between the assisting current and the steering effort. In FIG. 5, (a) represents a basic pattern when the vehicle is in a straight travelling state. The basic pattern (a) is shifted in the left or right direction in the figure depending of the offset voltage (Voffset) derived from the first pulse signal, that is, depending on the recovery compensating value corresponding to the steering angle and the vehicle speed. That is, when the vehicle is steered to the right, a pattern (b) is realized; and when the vehicle is steered to the left, a pattern (c) is realized.

By such a shift as above, recovery to the neutral steering angle is performed. For example, when the hands, which are holding the steering wheel, are released during steering to the right, the steering effort changes to "0" so that a left assisting current (−i) flows. By this left assisting current, the steering wheel is recovered to its neutral position.

In this connection, a part where no assisting current flows is a non-sensitive region for inhibiting an excessive assisting current to flow when the steering effort is smaller than a predetermined value (close to "0"). The width of the non sensitive region is determined by a voltage divided by the resistors 46 and 47 in the assisting torque calculating unit 4.

Figure 6:
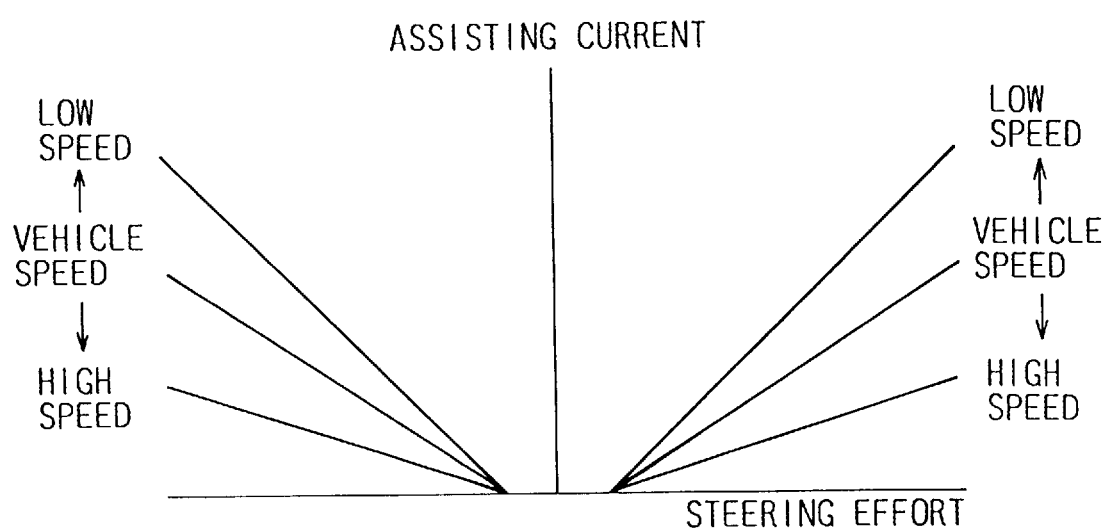
FIG. 6 is a graph showing the relation between the steering effort, the vehicle speed, and the assisting current.

In the multiplication calculating unit 5 also, the gain of the signal Vtrq is changed in accordance with the vehicle speed so that, as shown in FIG. 6, the slower the vehicle speed is, the larger the gain changes, with the result that a so-called vehicle-speed sensitive type assisting control can be performed.

Next, a calculating process performed in the microcomputer 20 is described.

The microcomputer 20 performs a calculating process to output the first and the second pulse signals for effecting the above-described recovery control to the neutral position and for effecting the vehicle speed sensitive control. This calculating process is described with reference to FIG. 7.

First, left and right wheel speed pulses are read from wheel speed sensors 18 and 19 (step SA1). From the left and right wheel speed pulses, left and right wheel speeds are calculated (step SA2). Then, based on the calculated left and right wheel speeds, an average wheel speed Vav is calculated (step SA3). Then, based on the ratio of the speeds of left and the right wheels determined in the step SA2, an estimated steering angle θ is calculated (step SA4). In this connection, in the microcomputer 20, a map representing a relation between the ratio of the speeds of the left and the right wheels and the estimated steering angle θ is stored so that the estimated steering angle θ corresponding to the ratio of the speeds of the left and the right wheels is extracted.

Then, in the next step SA5, a recovery compensating torque (recovery compensating value) to the neutral steering angle is determined based on the average vehicle speed Vav and the estimated steering angle θ, and, the first pulse signal having a duty ratio corresponding to the recovery compensating value is prepared and output. Here, the recovery compensating value is the one for recovery compensating the vehicle against the centrifugal force of the vehicle during turning, and is expressed as a function depending on the vehicle speed and the steering angle, i.e., f(Vav, θ). This function is stored as a map. Accordingly, by using the map, the duty ratio representing recovery compensating value is set based on the estimated steering angle θ and the average vehicle speed, and the first pulse signal having this duty ratio is output.

In more detail, when an electric power steering apparatus is not employed in a vehicle, recovery torque is generated to recover the steering wheel to its neutral position during turning a corner or during running along a curve. The recovery torque correspond to a centrifugal force and a cornering force. The centrifugal force is in proportion to the square of the speed of the vehicle, and the cornering force is in proportion to the steering angle of the steering wheel. When an electric power steering apparatus is employed in the vehicle, however, the recovery force is cancelled by the friction torque of the motor. In accordance with the present invention, to avoid the cancellation of the recovery torque, the above-mentioned recovery compensating value is generated as a function of the vehicle speed and the steering angle.

In the next step SA6, a gain for sensing the vehicle speed is determined, and the second pulse signal having the duty ratio corresponding to the gain is prepared and output. Here, the gain for sensing the vehicle speed is expressed as a function k(Vav) depending on the average vehicle speed Vav. This function is stored as a map. Accordingly, by using the map, the duty ratio representing the gain for sensing the vehicle speed is set based on the vehicle speed and the second pulse signal having this duty ratio is output.

Based on the first and the second pulse signals output at the above-described steps SA5 and SA6, the above-described process is carried out in the addition calculating unit 3 and the multiplication calculating unit 5.

In this connection, the frequencies of the first and the second pulse signals output from the microcomputer 20 are set to such values that the first and the second pulse signals can be sufficiently smoothed to be direct currents in response to the control response frequency of the analog torque servo system constructed by the phase compensating filter 2 through the current detecting unit 9. For example, when the frequency of the second pulse signal Dvgain is set to a value of ten times or more of the control response frequency of the torque servo system, a signal which sufficiently functions as a D.C. signal can be obtained.

Second Embodiment

Figure 8:
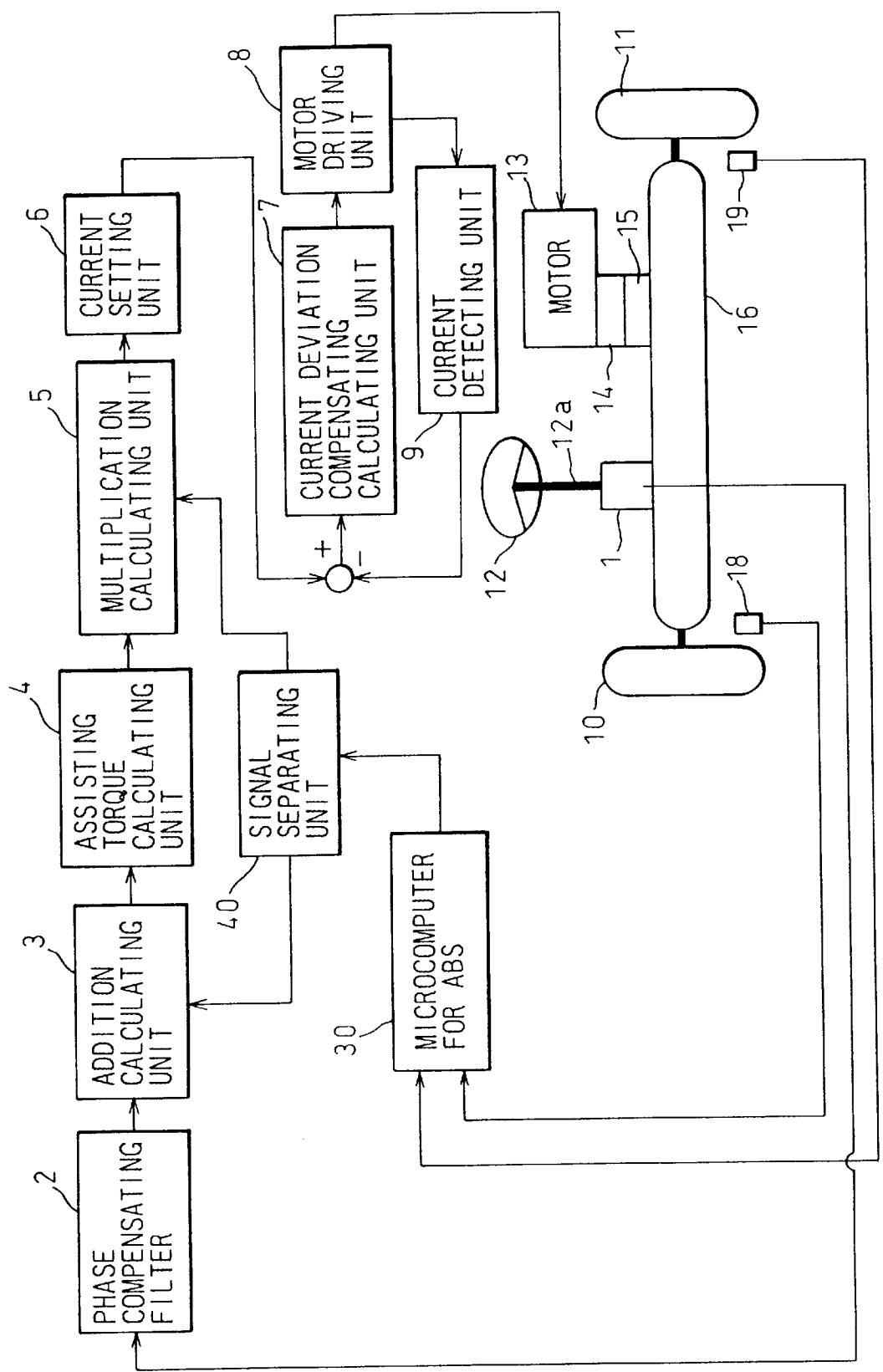
FIG. 8 is a block diagram of an electric power steering apparatus according to a second embodiment of the present invention.

Next, an example in which the present invention is applied to a vehicle provided with an antilock brake system (ABS) is described. FIG. 8 shows its over-all construction.

In FIG. 8, reference numeral 35 denotes a microcomputer which performs ABS control. In ABS control, brake control is carried out based on the wheel speed of each wheel of the vehicle. In this embodiment, by using the vehicle wheel speed, information regarding the steering angle θ and the average vehicle speed Vav, which are necessary for the above-described recovery control to the neutral steering angle and the vehicle speed sensitive control, is obtained. To this end, the microcomputer 35 for the ABS comprises a function to determine the steering angle θ and the vehicle speed Vav to send a PWM signal having this information. That is, as described later in detail, the PWM signal, in which the vehicle speed Vav is expressed as a frequency and the steering angle θ is expressed as a duty ratio, is output.

Figure 9:
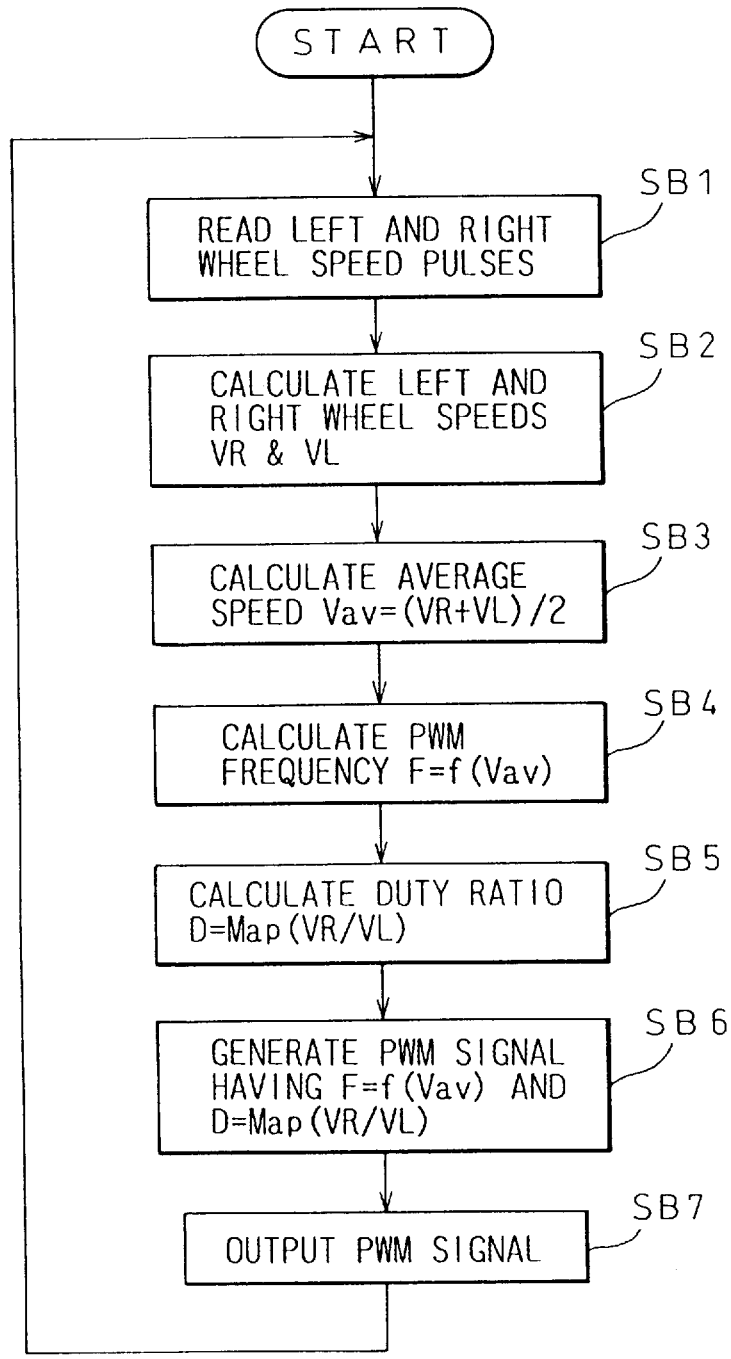
FIG. 9 is a flowchart showing a PWM signal output process of an ABS microcomputer in the second embodiment.

In the microcomputer 35 for the ABS, a calculating process for outputting the information of the above-mentioned steering angle θ and the vehicle speed Vav is described with reference to the flowchart shown in FIG. 9.

Figure 7:
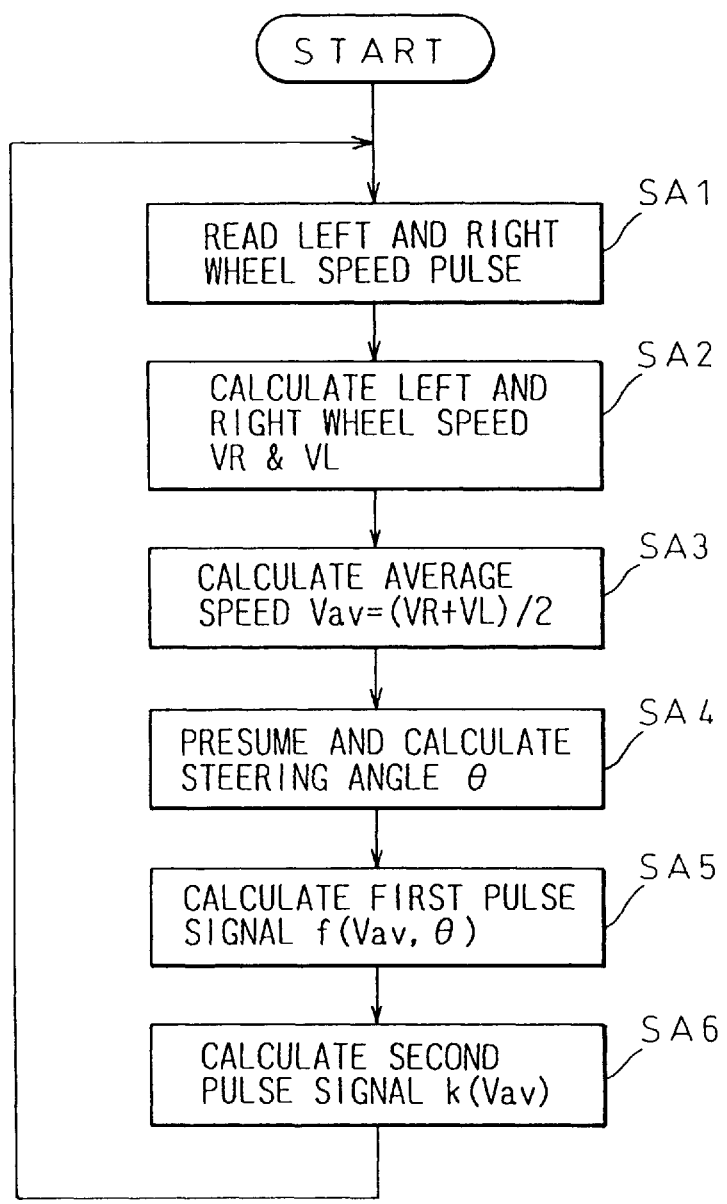
FIG. 7 is a main flowchart of a microcomputer in the block diagram in FIG. 1.

Steps SB1–SB3 are the same as the steps SA1–SA3 in FIG. 7. Then, based on the average vehicle speed Vav, a frequency F of the PWM signal to be generated is calculated (step SB4). In this connection, the relation between the average vehicle speed Vav and the frequency F is stored as a map in the microcomputer 35 so that the frequency F corresponding to the average vehicle speed Vav is extracted.

In the next step SB5, a ratio of the inner wheel speed to the outer wheel speed (VR/VL) and a duty ratio D of the PWM signal to be generated are determined based on the speeds VR and VL of the left and the right wheels. The ratio of the inner wheel speed to the outer wheel speed (VR/VL) relates to the steering angle θ so that the duty ratio D corresponding to the steering angle θ is extracted from the map by using the ratio of the inner wheel speed to the outer wheel speed (VR/VL).

Then, in the step SB6, the PWM signal having the frequency F and the duty ratio D extracted as above is generated. In the step SB7, the PWM signal is output.

Figure 10:
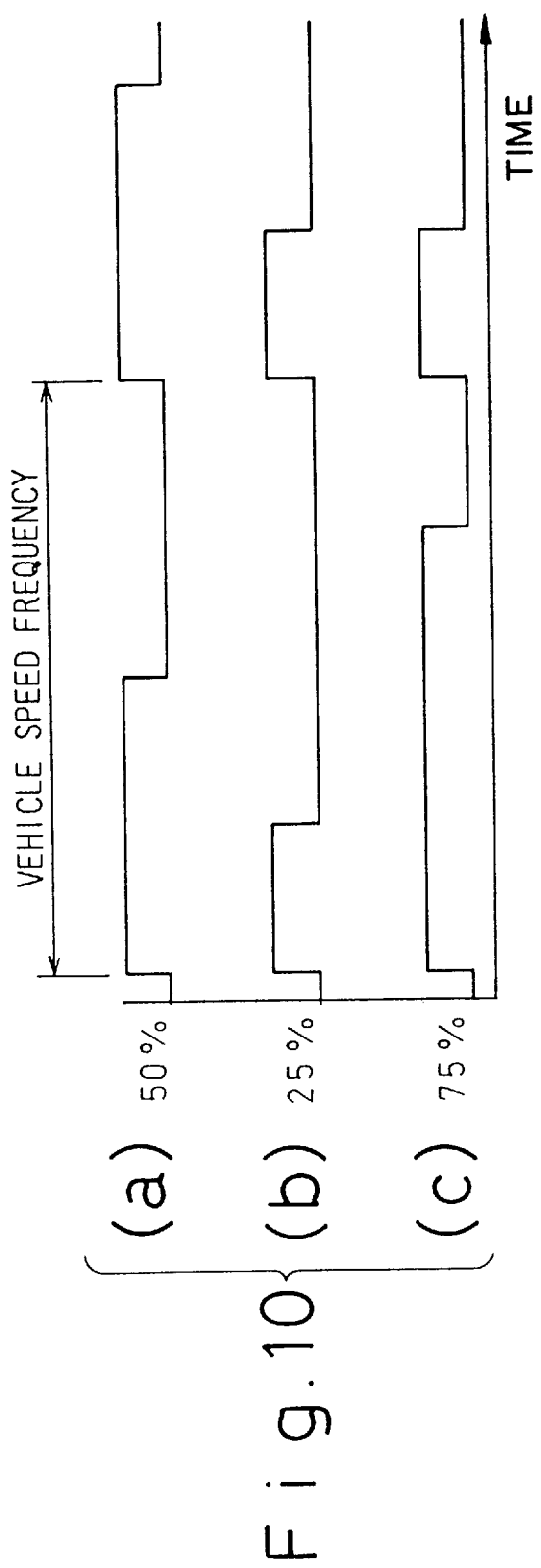
FIG. 10 is a waveform diagram of the PWM signal output from the ABS microcomputer 30, in which (a) shows the PWM signal having duty ratio of 50%; (b) shows a PWM signal having a duty ratio of 25%; and (c) shows a PWM signal having a duty ratio of 75%.

An example of this PWM signal is shown in FIG. 10. When the ratio of the inner wheel speed to the outer wheel speed is 1, that is, when the vehicle is running in a straight line, a PWM signal having a duty ratio of 50% is generated and output as shown by (a) in FIG. 10; when the vehicle is turning to the right, a PWM signal having a duty ratio smaller than 50% such as, for example, 25% as shown by (b) in FIG. 10 is generated and output; and when the vehicle is turning to the left, a PWM signal having a duty ratio larger than 50% such as, for example, 75% as shown by (c) in FIG. 10 is generated and output.

Figure 11:
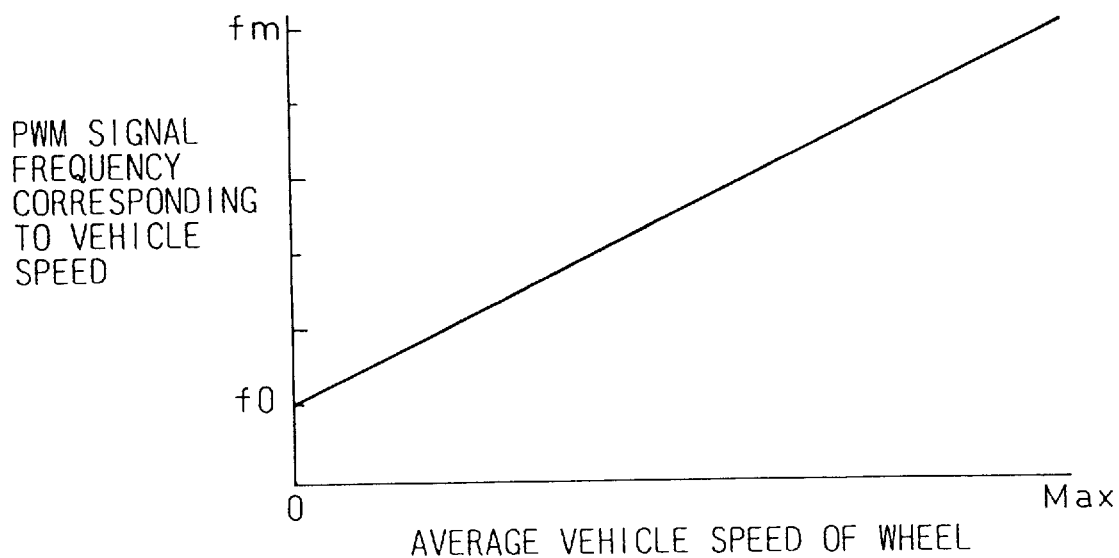
FIG. 11 is a graph showing the relation between the vehicle speed and the vehicle speed frequency.

Also, as shown in FIG. 11, the frequency of the PWM signal is set to be a value which changes from the minimum frequency f0 in proportion to the change of the average vehicle speed Vav.

Figure 12:
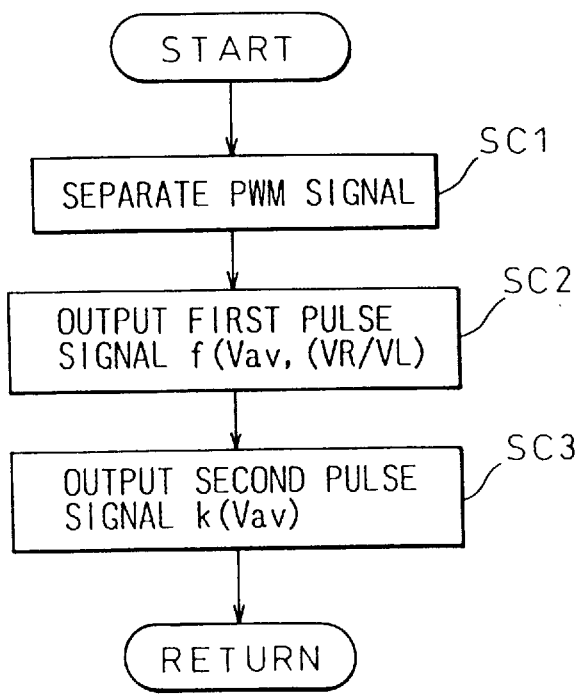
FIG. 12 is a flowchart showing the second pulse signal output process in the signal separating unit 40 shown in FIG. 8.

Accordingly, the average vehicle speed Vav and the steering angle θ of the vehicle can be expressed in one PWM signal. This output PWM signal is input to a signal separating unit 40 constructed by a microcomputer. A calculating process in this signal separating unit 40 is shown in FIG. 12.

First, at a step SC1, the PWM signal output from the above-mentioned microcomputer 30 for the ABS is read to extract the steering angle θ from the duty ratio of the PWM signal, and to extract the average vehicle speed Vav from the frequency of the PWM.

Then, at steps SC2 and SC3, based on the average vehicle speed Vav and the steering angle θ, a first and a second pulse signals are prepared and output in the similar way as in the steps SA5 and SA6 shown in FIG. 7 of the first embodiment.

As described above, in a vehicle provided with an ABS, a vehicle speed sensor is already provided and the function to calculate the vehicle speed is provided in the microcomputer 35 for carrying out ABS control, so that, by using their calculating results, the above-mentioned PWM signal can be easily generated.

In this connection, during ABS operation, the driver tightly holds the steering in order to avoid an emergency operation so that the recovery control during releasing hands from the steering is not necessary in this period. Accordingly, even when the microcomputer 35 for the ABS is used for recovery control of the steering when the ABS is in a non operating state, no problem arises.

Also, in this embodiment, signals are transmitted through signal lines between the microcomputer 35 for the ABS and the signal separating unit 40, so that the signal separating unit 40 can detect a disconnection of these signal lines.

Figure 13:
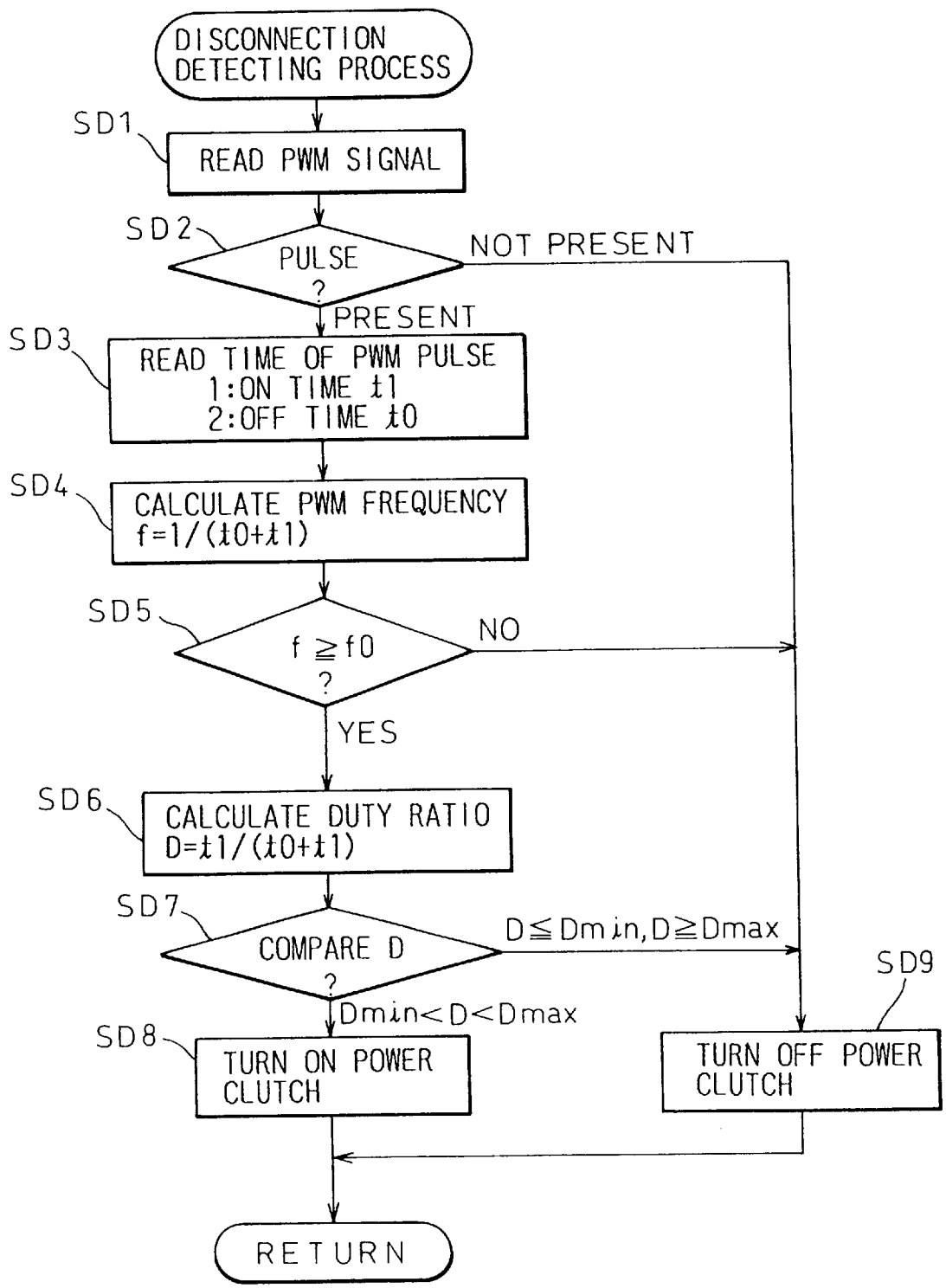
FIG. 13 is a flowchart showing the disconnection detecting process in the signal separating unit 40.

This disconnection detecting process is carried out in the signal separating unit 40 and is shown in FIG. 13.

First, the PWM signal from the ABS microcomputer 30 is read (step SD1) to judge whether or not the PWM signal is output (step SD2). When the PWM signal is output, the ON time t1 and the OFF time t0 of the PWM signal are read (step SD3). Then, based on the ON time t1 and the OFF time t0, the frequency f of the PWM signal is calculated (step SD4).

Here, as shown in FIG. 11, since the frequency of the PWM signal is set to be the minimum frequency f0 or more, it can be estimated that a disconnection or noise is mixed with the signal when the above-mentioned frequency f determined in the step SD4 is lower than the minimum frequency f0. Accordingly, it is judged whether or not the frequency f is the minimum frequency f0 or more (step SD5).

Then, based on the ON time t1 and the OFF time t0, the duty ratio D of the PWM signal is calculated (step SD6). Then, it is judged whether or not the duty ratio D is within a predetermined range (step SD7). When it is not within the predetermined range, it can be estimated that a malfunction due to a disconnection is generated or noise is mixed with the signal. That is, even when the frequency f is the minimum frequency f0 or more, if the duty ratio D is not a normal value, it is judged that a malfunction due to a disconnection or the like has occurred.

Then, when the process proceeds to a step SD8 through the above-mentioned step SD7, it is judged that the malfunction of the disconnection has not occurred so that a power clutch is kept ON. When it is judged that an abnormality has occurred at the step SD2, SD5, or SD7, the power clutch 14 is turned off.

Thus, since the power switch 14 is turned off when an abnormality such as a disconnection has occurred, manual steering operation can be carried out without being influenced by the motor 13.

In this second embodiment, the information about the average vehicle speed Vav and the steering angle θ is obtained from the ABS microcomputer 30. Alternatively, if there is a control unit for controlling the vehicle using the speed signals of the left and the right wheels other than the ABS control, it may also be possible to obtain the information about the average vehicle speed Vav and the steering angle θ from the control unit.

Also, it has been described that the steering angle θ is determined from the ratio of the left wheel speed to the right wheel speed, however, it may also be possible that the steering angle θ is determined by using the speeds of the left and the right wheels as they are, or by using, other than the ratio, the other information which is obtained by modifying the speeds of the left and the right wheels.

Further, in the above-described second embodiment, the speeds of the left and the right wheels detected by the ABS control system are used to generate the recovery forth of the steering wheel, however, alternatively, it may also be possible according to the present invention to use the detected speeds of the vehicle wheels for controlling any other unit in the vehicle.

Third Embodiment

In the following, an electric power steering apparatus according to a third embodiment of the present invention will be described.

Figure 14:
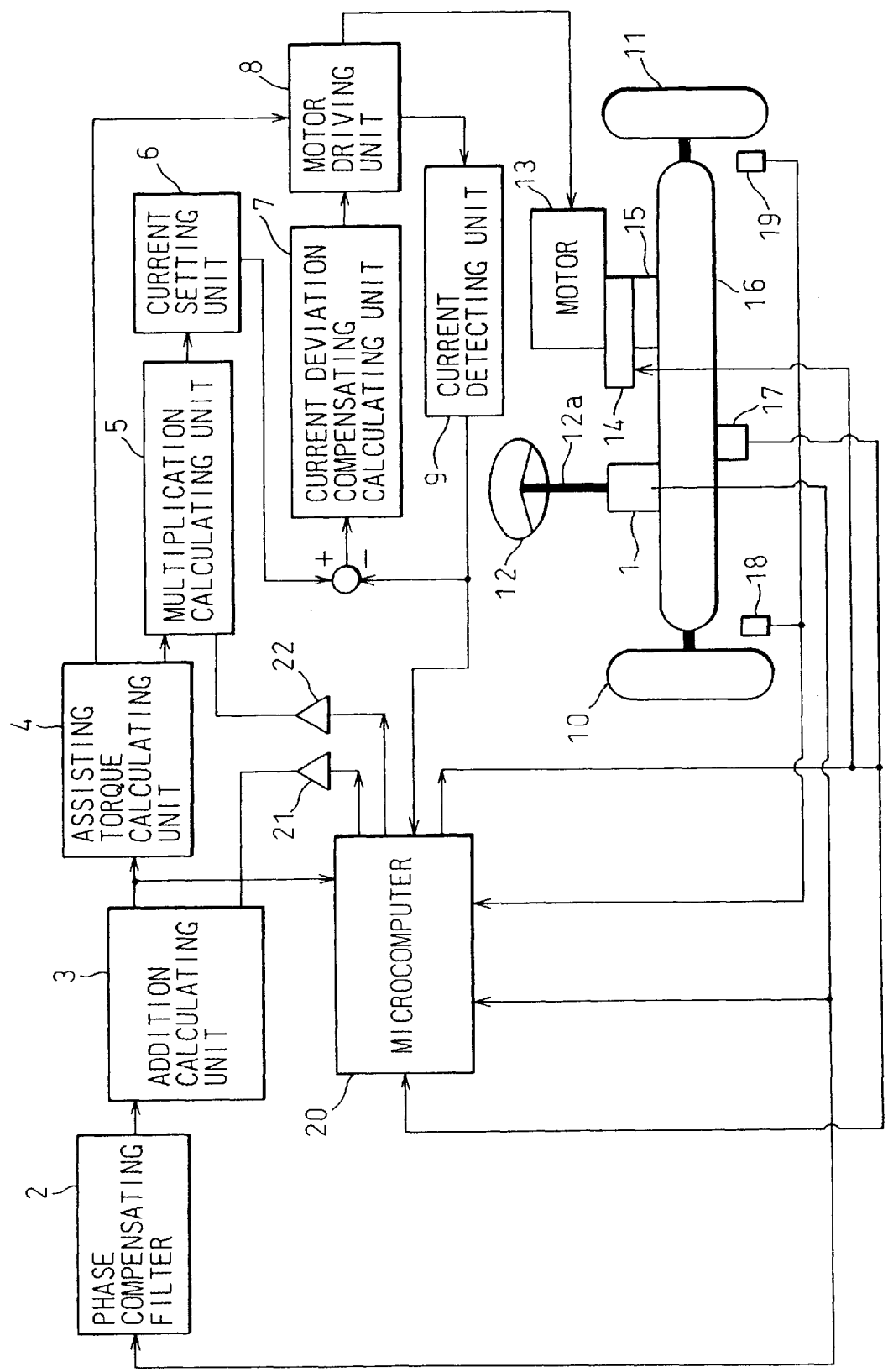
FIG. 14 is a block diagram showing a main construction of an electric power steering apparatus according to a third embodiment of the present invention.

FIG. 14 is a constructional diagram showing a main construction of an electric power steering apparatus according to the third embodiment of the present invention. The difference between FIG. 1 and FIG. 14 is that, in FIG. 14, a steering angle sensor 17 for detecting a steering angle is provided on the rack shaft 16. The other portions and their operations are the same as those described with reference to FIG. 1 to FIG. 6, and therefore, the explanations thereof are omitted here for avoiding a redundant description. In addition to the operation to prepare and output the first and the second pulse signals as in the first embodiment, the microcomputer 20 in this third embodiment further operates as follows.

That is, the microcomputer 20 calculates an estimated assisting motor current from the torque sensor output based on the characteristic model of the torque servo system in the above-mentioned analog circuit, compares this with an actual motor current (hereinafter referred to as a real motor current), carries out a malfunction diagnosis of the analog servo system based on the compared result, and so forth.

Figure 15:
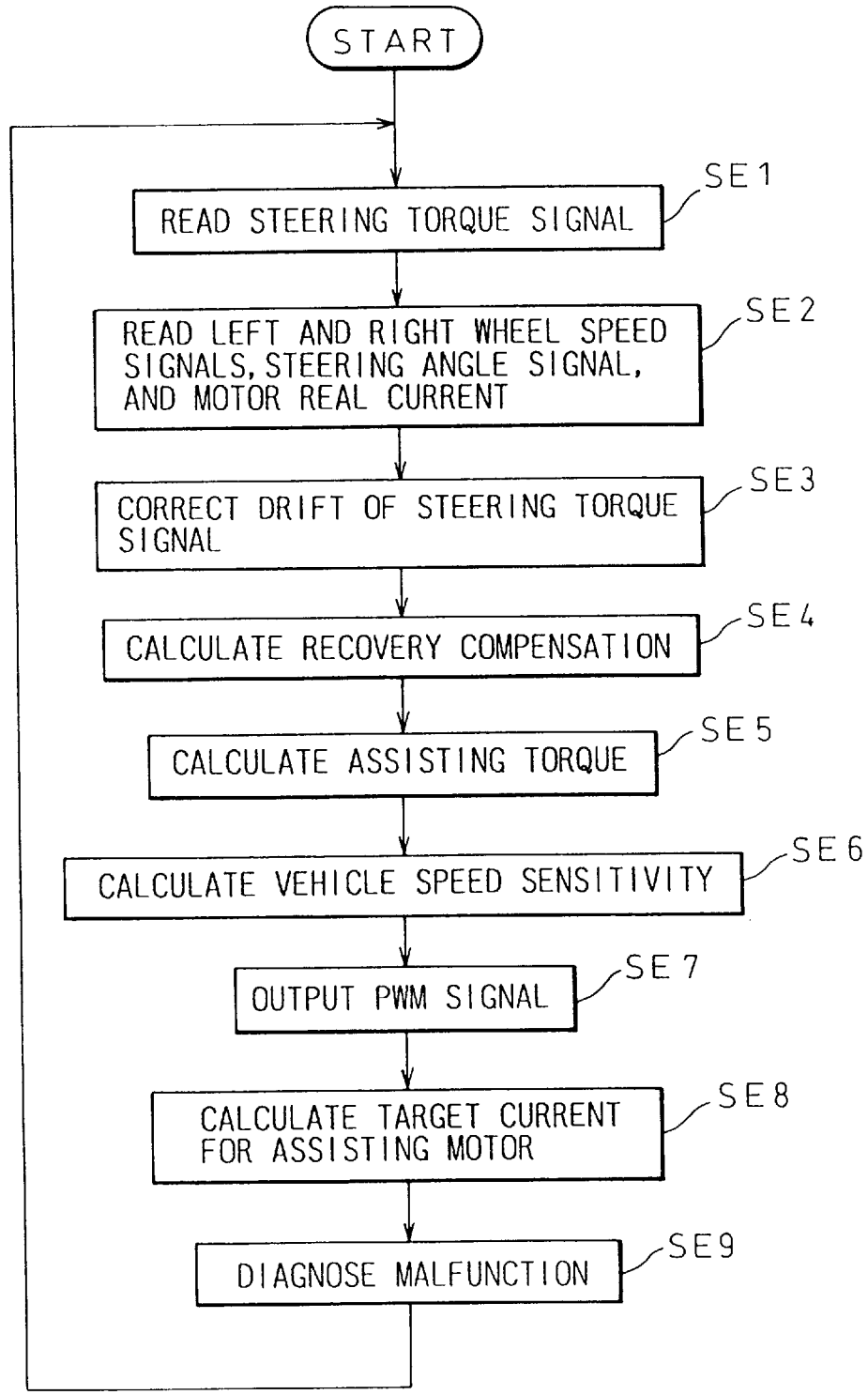
FIG. 15 is a main flowchart of a microcomputer in the block diagram in FIG. 14.

The main calculating process by the microcomputer 20 in FIG. 14 is shown by a flowchart in FIG. 15.

First, at a step SE1, a steering torque signal is read from the torque sensor 1. At a step SE2, signals of the left and the right vehicle wheels, a steering angle signal, and a real motor current are read from the vehicle speed sensors 18 and 19, the steering angle sensor 17, and the power clutch 14, respectively.

Then, at a step SE3, a drift correction process, which is described in detail later, is carried out. At a step SE4, a recovery compensation calculation is carried out.

In this recovery compensation calculation, a recovery compensating torque (recovery compensating value) to the neutral steering angle is obtained based on the running speed (vehicle speed v) of the vehicle and the steering angle θ which are obtained by averaging the signals of the left and the right wheels read at the step SE2.

Here, the recovery compensating value is for effecting recovery compensation against a centrifugal force of the vehicle during turning so that it can be expressed as a function of the vehicle speed and the steering angle, i.e., f(v, θ). This function is stored as a map. Therefore, by using the map, the recovery compensating value can be obtained from the steering angle and the vehicle speed.

Then, an added value is obtained by adding this recovery compensating value and the steering torque signal read at the step SE1. This added value is equivalent to an output signal Vout of the addition calculating unit 3.

In the next step SE5, an estimated assisting torque is calculated, In practice, based on the added value obtained at the step SE4, an assisting torque is obtained by using a predetermined map. This value is equivalent to a signal Vtrq output from the assisting torque calculating unit 4.

At the next step SE5, a vehicle speed sensitivity is calculated by using a gain for a vehicle sensitivity. The gain of the vehicle speed sensitivity is expressed as a function K(v) of a vehicle speed v. This function is stored as a map. Accordingly, by using the map, the gain of the vehicle sensitivity is obtained from a vehicle speed.

Then, by multiplying the assisting torque obtained at the step SE4 by the above-mentioned gain of the vehicle speed sensitivity, an assisting torque in which the gain has been changed is obtained. This value is equivalent to the output of the multiplicity calculating unit 5.

At the next step SE7, a first pulse signal having a duty ratio representing the recovery compensating value obtained at the step SE4 is prepared and output, and a second pulse signal having a duty ratio representing the vehicle speed sensitive gain obtained at the step SE6 is prepared and output. Based on these first and second pulse signals, the above-described processes are carried out in the addition calculating unit 3 and the multiplication calculating unit 5.

In this connection, similar to the first embodiment, the frequencies of the first and the second pulse signals output from the microcomputer 20 are set to values by which the first and the second pulse signals can be sufficiently smoothed to be direct currents in response to the control response frequency of the analog torque servo system constructed by the phase compensating filter 2 through the current detecting unit 9. For example, when the frequency of the second pulse signal Dvgain is set to a value of ten times or more of the control response frequency of the torque servo system, a signal sufficiently functioning as a D.C. signal can be obtained.

At the next step SE8, based on the assisting torque in which the gain has been changed at the step SE6, a motor assisting target current, that is, as estimated current value (target current value $M_c$) to be passed through the motor 13 is obtained by using a predetermined map.

Then, at the next step SE9, a malfunction diagnosis is carried out by the target current value $M_c$ and a real current value $i_m$ of the real current of the motor is read at the step SE2. A detailed process of this malfunction diagnosis is shown in FIG. 16.

Figure 16:
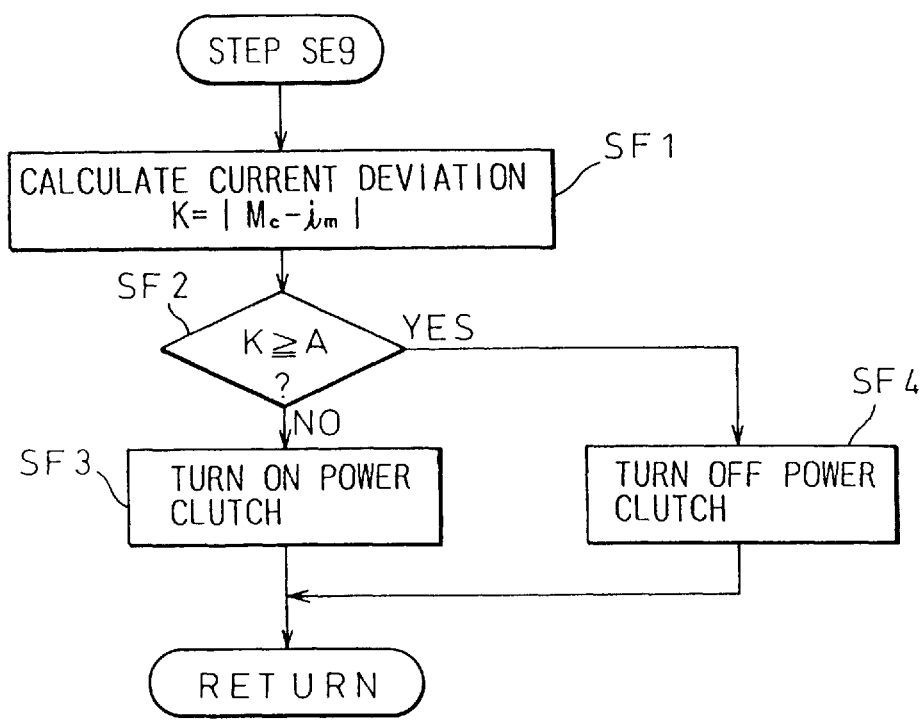
FIG. 16 is a flowchart showing the process of a malfunction diagnosis in the third embodiment.

At a step SF1 in FIG. 16, an absolute value K of the deviation between the target current value $M_c$ and the real current value $i_m$ is calculated. Then, at a step SF2, it is judged whether or not the absolute value K of the deviation is a predetermined value A or more. When the absolute value K of the deviation is smaller than the predetermined value A, the torque servo system is judged to be normal and the process proceeds to the step SF3 to keep ON a power clutch 14. When the absolute value K of the deviation is judged to be equal to the predetermined value A or more, however, the process proceeds to the step SF4 to turn OFF the power clutch 14. Namely, when the real current value $i_m$ largely differs from the target current value $M_c$, it is judged that an abnormality has been generated in the torque servo system so that the power clutch 14 is turned OFF.

Accordingly, when the torque assist by the motor 13 cannot be carried out due to a malfuction, the motor 13 and the speed reduction gear 15 are separated, so that the steering operation can be carried out without being influenced by the friction torque between the motor 13 and the speed reduction gear 15.

In this connection, in case of the above-described malfunction diagnosis, a time lag is produced between the reading time of the real current of the motor and the motor assisting target current, however, it is set to be sufficiently allowable to perform the above-mentioned malfunction diagnosis.

In addition, the above-mentioned malfuction diagnostic function may not need to be processed at the high speed required for the torque servo or motor current control but may be processed within a range in which the process does not badly influence the vehicle running. Therefore, the microcomputer 20 may not need to be an expensive high-speed processing type but may be a low-speed type to sufficiently carry out the calculation and processing of the malfunction diagnosis.

Next, the drift correction process (step SE3) of the steering torque signal will be described in detail.

In the steering torque signal from the torque sensor 1, a drift may be generated to provide a certain amount of output even when the steering effort is zero. To cancel the drift when the steering effort is zero, the microcomputer 20 outputs a first pulse signal, by which the value of the steering torque signal read from the addition calculating unit 3 becomes zero, when the microcomputer judges that the vehicle is running in a straight line. A detailed process of this drift correction is shown in FIG. 17.

First, a difference (changed amount of the steering angle) between a current steering angle read at the step SE2 and the steering angle read in the last time and stored is calculated (step SG1). The changed amount is compared with a predetermined value $\alpha$ to judge whether or not the steering angle is smaller than the value $\alpha$ (step SG2). As a result of the judgment, when it is smaller that the predetermined value $\alpha$, that is, when the steering effort is kept constant, a torque sensor signal detected by the torque sensor is read (step SG3).

The absolute value of the torque Trq representing the amount of the read torque sensor signal is compared with a predetermined value T1 to judge whether or not a steering torque is applied, that is, whether or not the steering is at the neutral position (step SC4). When the judged result is the result indicating that the absolute value of the torque Trq is smaller than the predetermined value T1, it can be estimated that the steering is kept to the neutral position, that is, the vehicle is running in a straight line.

Next, at a step SG5, the amount of the torque Trq is determined. When a positive or negative value is detected during running in a straight line in which, normally, the Trq should be zero, a drift is considered to be generated in the steering torque signal so that the duty ratio of the first pulse signal is corrected to make the drift in the steering torque signal zero.

In practice, when Trq<0 is judged, the first pulse signal in which the duty ratio is increased by a predetermined value at the step SG6 is output. When Trq>0 is judged, the first pulse signal in which the duty ratio is decreased by a predetermined value at the step SG7 is output. When straight line running of the vehicle is judged, the drift correction of the steering torque signal is carried out by repeating the above-mentioned process until Trq becomes zero.

In the above-described embodiment, the steering angle sensor 17 is used as the steering angle detecting means, however, it may also be possible to use means to obtain the steering angle from the speed difference between the speeds of the left and the right vehicle wheels. Also, as the vehicle speed detecting means for detecting the running speed of the vehicle, although the speeds of the left and the right vehicle wheels are detected, however, it may also be possible to obtain the vehicle speed by a vehicle speed sensor.

Further, as a construction for outputting the control parameters, although the microcomputer 20 is used, however, it may also be possible to use another digital circuit construction.

What is claimed is:

1. An electric power steering apparatus comprising:
   a motor for generating assisting torque in response to a movement of a steering wheel of a vehicle;
   steering torque detecting means for detecting steering torque of said steering wheel to output a steering torque signal, wherein the assisting torque generated by said motor is controlled based on said steering torque signal output from said steering torque detecting means;
   steering angle calculating means for calculating a steering angle based on speeds of a left steered wheel and a right steered wheel of the vehicle;

recovery compensating means for calculating recovery compensating torque based on the steering angle calculated by said steering angle calculating means; and means for applying said recovery compensating torque to said steering apparatus.

2. An electric power steering apparatus as claimed in claim 1, wherein said recovery compensating means comprises:

signal generating means for outputting a recovery compensating signal for generating the recovery compensating torque, and converting means for adjusting said steering torque signal with the recovery compensating signal.

3. An electric power steering apparatus as claimed in claim 2, wherein said steering torque signal is a direct current signal which proportionally changes in response to said steering torque, and said converting means shifts said steering torque signal in a D.C. fashion by using said recovery compensating signal.

4. A control apparatus as claimed in claim 1, further comprising wheel speed detecting means for detecting the speeds of the left and the right steered wheels, said wheel speed detecting means being included in an anti-block braking system for performing brake control based on said speeds of the left and the right wheels.

5. A control apparatus as claimed in claim 1, wherein a vehicle speed is calculated based on the speeds of the left and the right steered wheels, and the recovery compensating torque is calculated based on the vehicle speed and the steering angle.

6. An electric power steering apparatus comprising:

a motor for generating assisting torque in response to a movement of a steering wheel of a vehicle;

steering torque detecting means for detecting steering torque of said steering wheel to output a steering torque signal;

signal generating means for outputting a recovery compensating signal, for generating recovery compensating torque, based on speeds of left and right steered wheels of the vehicle, and for outputting a vehicle speed sensitive gain signal based on a running speed of said vehicle;

converting means for outputting a recovery compensated signal based on the steering torque signal and the recovery compensating signal;

assisting torque calculating means for discriminating a rotary driving direction of said motor based on the recovery compensated signal, and for outputting an assisting torque signal;

gain changing means for change a gain of the assisting torque signal in response to said vehicle speed sensitive gain signal; and motor driving means for driving said motor based on a magnitude of the gain-changed assisting torque signal and on said discriminated rotary driving direction of the motor.

7. An electric power steering apparatus as claimed in claim 6, wherein said steering torque signal is a direct current signal which proportionally changes in response to said steering torque, and said converting means shifts said steering torque signal in a D.C. fashion by using said recovery compensating signal.

8. An electric power steering apparatus as claimed in claim 7, wherein said signal generating means output a pulse signal having a duty ratio representing said recovery compensating torque, said converting means converting said pulse signal into a D.C. signal, and shifting said steering torque signal in a D.C. fashion by using the D.C. signal.

9. An electric power steering apparatus as claimed in claim 8, wherein:

said apparatus includes vehicle wheel speed detecting means for detecting the speeds of the left and the right steered wheels of the vehicle; and said signal generating means outputs said recovery compensating signal by determining a ratio of the speeds of the left and the right steered wheels of the vehicle using vehicle wheel speed signals from the vehicle wheel speed detecting means.

10. An electric power steering apparatus as claimed in claim 8, wherein said signal generating means receives, through a signal line, a signal for determining said ratio of the speeds of the vehicle wheels from a control unit for performing another control of the vehicle based on the speeds of the left and the right steered wheels of the vehicle, and for outputting said recovery compensating signal by using the received signal.

11. An electric power steering apparatus as claimed in claim 10, wherein said signal generating means includes detecting means for detecting a disconnecting state of said signal line based on the received signal from said control unit for performing the other control.

12. An electric power steering apparatus as claimed in claim 11, wherein said signal generating means includes means for stopping said assisting torque by said motor when said disconnecting state is detected.

13. An electric power steering apparatus as claimed in claim 10, wherein said control unit for performing another control of the vehicle is a control unit for performing brake control of the vehicle.

14. An electric power steering apparatus comprising:

a motor for generating assisting torque in response to a movement of a steering wheel of a vehicle;

steering torque detecting means for detecting steering torque of said steering wheel to output a steering torque signal as an analog signal;

assisting torque controlling means for outputting, based on the steering torque signal, an assisting torque analog signal to control the assisting torque generated by said motor;

driving means for driving said motor based on said assisting torque analog signal; and parameter setting means for setting control parameters for changing said assisting torque, said parameter setting means including digital circuit means for preparing and outputting a pulse signal with a duty ratio representing said control parameters;

said assisting torque control means including an analog circuit means for changing said assisting torque based on the duty ratio of said output pulse signal.

15. An electric power steering apparatus as claimed in claim 14, wherein said digital circuit means includes means for preparing and outputting a first pulse signal with a duty ratio representing recovery compensating torque to a neutral position based on at least a steering angle of the vehicle.

16. An electric power steering apparatus as claimed in claim 14, wherein said analog circuit means includes a converting circuit for converting said first pulse signal into a D.C. signal having a value corresponding to the duty ratio of the first pulse signal, and a circuit for shifting said assisting torque in a D.C. manner by using the converted D.C. signal.

17. An electric power steering apparatus as claimed in claim 14, wherein said digital circuit means includes means for preparing and outputting a second pulse signal with a duty ratio corresponding to a running speed of the vehicle.

18. An electric power steering apparatus as claimed in claim 17, wherein said analog circuit means includes a circuit for changing a gain of said assisting torque in accordance with the duty ratio of said second pulse signal.

19. An electric power steering apparatus comprising:
   a motor for generating assisting torque in response to a movement of a steering of a vehicle;
   steering torque detecting means for detecting steering torque of said steering to output a steering torque signal;
   computer means for receiving an angle signal representing a steering angle of the vehicle and a speed signal representing a running speed of the vehicle, said computer means outputting a first pulse signal with a duty ratio representing recovery compensating torque based on the steering angle and the running speed represented by the angle and speed signals and a second pulse signal with a duty ratio representing a gain corresponding to said detected running speed; and
   an assisting torque control circuit constructed by an analog circuit for controlling, based on said steering torque signal, the assisting torque generated by said motor, and said assisting torque control circuit comprising:
      a recovery compensating unit for smoothing said first pulse signal and for shifting, in a D.C. manner, said steering torque signal by the smoothed first pulse signal;
      an assisting torque calculating unit for determining a rotary driving direction based on the steering torque signal shifted in the D.C. manner and for outputting an assisting torque signal;
      a gain changing unit for changing a gain of said assisting torque signal in accordance with the duty ratio of said second pulse signal; and
      a motor driving unit for driving said motor based on the amount of the gain-changed assisting torque signal and said determined rotary driving direction of the motor.

20. An electric power steering apparatus as claimed in claim 19, wherein said recovery compensating unit comprises a smoothing circuit for smoothing said first pulse signal into a signal having a magnitude corresponding to the duty ratio of said first pulse signal, and an addition circuit for adding said smoothed D.C. signal and said steering torque signal.

21. An electric power steering apparatus as claimed in claim 19, wherein said gain changing unit comprises a switching circuit for switching in response to said second pulse signal and the assisting torque signal in which said gain has been changed by the switching operation is output as a D.C. signal.

22. An electric power steering apparatus as claimed in claim 19, wherein frequencies of said first pulse signal and second pulse signal are set to values which can make said first pulse signal and second pulse signal function as direct current signals in response to a response frequency of a torque servo system in said assisting torque control circuit.

23. An electric power steering apparatus as claimed in claim 19, wherein said computer means includes:
   means for reading a real motor current value actually flowing through said motor;
   means for estimating and calculating a target motor current value for driving said motor, based on said steering torque signal, the angle signal and the speed signal; and
   malfunction diagnosing means for stopping the assisting torque generated by said motor when the difference between the target motor current value and the real motor current value is a predetermined value or more.

24. An electric power steering apparatus as claimed in claim 19, wherein said computer means includes straight running detecting means for detecting a straight running state of the vehicle, and means for changing the duty ratio of said first pulse signal in such a manner that, when the straight running state is detected, the steering torque signal to be shifted in said recovery compensating unit has the value corresponding to a state in which the steering torque is zero.

25. An electric power steering apparatus as claimed in claim 24, wherein said straight running detecting means detect the straight running state of said vehicle when an amount of change of said steering angle is a first predetermined value or less, and said steering torque is a second predetermined value or less.

* * * * *